US008967556B2

(12) United States Patent
Meyers et al.

(10) Patent No.: US 8,967,556 B2
(45) Date of Patent: Mar. 3, 2015

(54) TWO SHOT TUBE RETENTION CLIP WITH RESILIENT LIVING HINGE

(75) Inventors: Jason A. Meyers, Shelby Township, MI (US); Roger E. Pilon, New Baltimore, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/418,446

(22) Filed: Mar. 13, 2012

(65) Prior Publication Data
US 2013/0240684 A1 Sep. 19, 2013

(51) Int. Cl.
F16L 3/08 (2006.01)
F16L 3/12 (2006.01)
F16L 15/00 (2006.01)
F16L 5/00 (2006.01)
E21F 17/02 (2006.01)

(52) U.S. Cl.
USPC ........... 248/74.1; 248/74.2; 248/60; 248/68.1

(58) Field of Classification Search
CPC ..... F16L 3/2235; F16L 55/223; F16L 3/1075; F16L 55/035; H02G 3/30
USPC ............... 248/548, 65, 67.5, 68.1, 74.1, 74.2, 248/74.4, 909
See application file for complete search history.

(56) References Cited

U.S. PATENT DOCUMENTS

| | | |
|---|---|---|
| 4,467,988 A | 8/1984 | Kraus |
| 4,614,321 A | 9/1986 | Andre |
| 5,115,542 A | 5/1992 | Gehres |
| 5,184,794 A * | 2/1993 | Saito ............................ 248/68.1 |
| 5,257,768 A | 11/1993 | Juenemann et al. |
| 5,460,342 A | 10/1995 | Dore et al. |
| 5,464,179 A | 11/1995 | Ruckwardt |
| 5,494,245 A | 2/1996 | Suzuki et al. |
| 5,984,242 A | 11/1999 | Meyer |
| 6,105,216 A | 8/2000 | Opperthauser |
| 6,152,406 A | 11/2000 | Denndou |
| 6,539,920 B1 | 4/2003 | Spiers |
| 6,601,802 B1 * | 8/2003 | Howe ............................ 248/58 |
| 6,665,484 B2 | 12/2003 | Douglas et al. |
| 6,771,871 B2 | 8/2004 | Krampotich et al. |
| 6,809,257 B2 | 10/2004 | Shibuya |
| 6,892,020 B2 | 5/2005 | Douglas et al. |

(Continued)

FOREIGN PATENT DOCUMENTS

WO    WO 2011/028705    3/2011

Primary Examiner — Jonathan Liu
Assistant Examiner — Muhammad Ijaz
(74) Attorney, Agent, or Firm — Harness, Dickey & Pierce, P.L.C.

(57) ABSTRACT

A retention clip includes first and second body portions created of a first polymeric material. The body portions when angularly rotated apart define an open position, and when rotated into direct contact defining an engaged position. An isolation portion is created of a resilient second polymeric material. The isolation portion includes isolation members connected to the body portions. The isolation members are positioned facing each other when the retention clip is in the engaged position. The isolation members frictionally contact and retain a tubular shaped member in the engaged position. A living hinge integrally connects the body portions allowing the body portions to rotate with respect to each other. The living hinge provides the only connection between the body portions as the body portions transition between the open position and the engaged position. A frangible connector initially integrally connects the first and second body portions only in the open position.

12 Claims, 11 Drawing Sheets

(56) References Cited

U.S. PATENT DOCUMENTS

| | | |
|---|---|---|
| 6,926,237 B2 | 8/2005 | Shereyk et al. |
| 6,947,654 B2 | 9/2005 | Krampotich et al. |
| 7,011,277 B2 | 3/2006 | Mizukoshi et al. |
| 7,062,822 B2 | 6/2006 | Folkmar |
| 7,071,418 B2 | 7/2006 | Brockman et al. |
| 7,114,686 B2 | 10/2006 | Andrigo |
| 7,201,351 B2 | 4/2007 | Stigler |
| 7,201,352 B2 * | 4/2007 | Kawai ............ 248/74.1 |
| 7,207,528 B2 | 4/2007 | Kato |
| 7,267,307 B2 | 9/2007 | Bauer |
| 7,278,190 B2 | 10/2007 | Fischer et al. |
| 7,387,282 B2 * | 6/2008 | Kovac ............ 248/74.4 |
| 7,448,579 B2 * | 11/2008 | Kwilosz et al. ........... 248/71 |
| 7,520,475 B2 | 4/2009 | Opperthauser |
| 7,600,725 B2 | 10/2009 | Mizukoshi |
| 7,658,350 B2 * | 2/2010 | Bauer .............. 248/65 |
| 7,770,850 B2 * | 8/2010 | Allmann et al. ....... 248/68.1 |
| 7,784,745 B2 | 8/2010 | Dodge |
| 7,887,012 B2 * | 2/2011 | Desai et al. .......... 248/55 |
| 8,020,810 B2 * | 9/2011 | Dietrich et al. ........ 248/63 |
| 8,020,812 B2 | 9/2011 | Matsuno et al. |
| 2003/0108322 A1 | 6/2003 | Douglas et al. |
| 2004/0188570 A1 | 9/2004 | Bauer |
| 2004/0217236 A1 * | 11/2004 | Shibuya .............. 248/68.1 |
| 2004/0217314 A1 | 11/2004 | Burian et al. |
| 2005/0067548 A1 | 3/2005 | Inoue |
| 2005/0098688 A1 | 5/2005 | Miarka et al. |
| 2005/0116122 A1 * | 6/2005 | Nakanishi ............ 248/68.1 |
| 2005/0206183 A1 | 9/2005 | Andrigo |
| 2005/0253025 A1 * | 11/2005 | Benoit et al. .......... 248/74.1 |
| 2005/0284989 A1 * | 12/2005 | Mizukoshi ............ 248/65 |
| 2006/0008235 A1 | 1/2006 | Krampotich et al. |
| 2006/0273226 A1 * | 12/2006 | Jatzke ............... 248/68.1 |
| 2007/0018057 A1 | 1/2007 | Kovac |
| 2009/0294600 A1 | 12/2009 | Dodge |
| 2010/0025272 A1 | 2/2010 | Stau et al. |
| 2010/0207001 A1 | 8/2010 | Smith et al. |
| 2012/0153095 A1 * | 6/2012 | Child et al. ........... 248/68.1 |
| 2013/0001373 A1 * | 1/2013 | Ogawa .............. 248/65 |
| 2013/0146720 A1 * | 6/2013 | Meyers et al. ......... 248/68.1 |

* cited by examiner

TWO SHOT TUBE RETENTION CLIP WITH RESILIENT LIVING HINGE

FIELD

The present disclosure relates to fasteners used in automobile vehicle service to retain and route tubing and electrical wiring.

BACKGROUND

This section provides background information related to the present disclosure which is not necessarily prior art.

Clips and fasteners are known which are used to retain tubular shaped objects such as metal or rubber tubing used for hydraulic, vacuum, fuel and similar services, and electrical wires, cables, and wire bundles in automobile vehicles. Vibration and sound transmitted from an upstream or downstream component of the vehicle can be transferred through the fastener to the body panel to which the fastener is connected, thereby inducing unwanted noise. Resilient material inserts reduce this noise transmission. To permit first and second halves of the clip to be rotated into an engaged position, a living hinge can be provided between the first and second halves. Where a connector is present in the area of the living hinge the connector is large and is retained with the living hinge when the clip is assembled. A disadvantage of this configuration is the connector initially resists rotation as the halves are coupled, and therefore creates a biasing force which undesirably acts to open the connector.

SUMMARY

This section provides a general summary of the disclosure, and is not a comprehensive disclosure of its full scope or all of its features.

According to several aspects of the disclosure, a retention clip includes first and second body portions both created of a first polymeric material. The body portions when rotated away from contacting each other define an open position, and when rotated into contact with each other define an engaged position. An isolation portion created of a resilient second polymeric material includes a living hinge integrally connecting the body portions allowing the body portions to rotate with respect to each other. A frangible connector initially integrally connects the first and second body portions in the open position. The frangible connector breaks when the body portions move away from the open position and toward the engaged position such that the living hinge provides the only connection between the body portions as the body portions transition between the open position and the engaged position.

According to further aspects, a retention clip includes first and second body portions both created of a first polymeric material. The body portions when angularly rotated with respect to each other define an open position, and when rotated into direct contact with each other define an engaged position. An isolation portion is created of a resilient second polymeric material. The isolation portion includes isolation members individually connected to each of the first and second body portions. The isolation members are positioned facing each other when the retention clip is in the engaged position. The isolation members frictionally contact and thereby retain a tubular shaped member in the engaged position. A living hinge integrally connects the body portions allowing the body portions to rotate with respect to each other. The living hinge provides the only connection between the body portions as the body portions transition between the open position and the engaged position. A frangible connector initially integrally connects the first and second body portions only in the open position.

According to additional aspects, a method for retaining tubular shaped objects using a retention clip includes: initially angularly separating the body portions defining an open position; positioning a tubular shaped member in contact with one of the first or second isolation members; angularly rotating the body portions away from the open position and into direct contact with each other thereby defining an engaged position having the first and second isolation members facing each other and contacting the tubular shaped member; and initially integrally connecting the first and second body portions only in the open position by a frangible connector, the frangible connector breaking when the body portions move away from the open position and toward the engaged position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
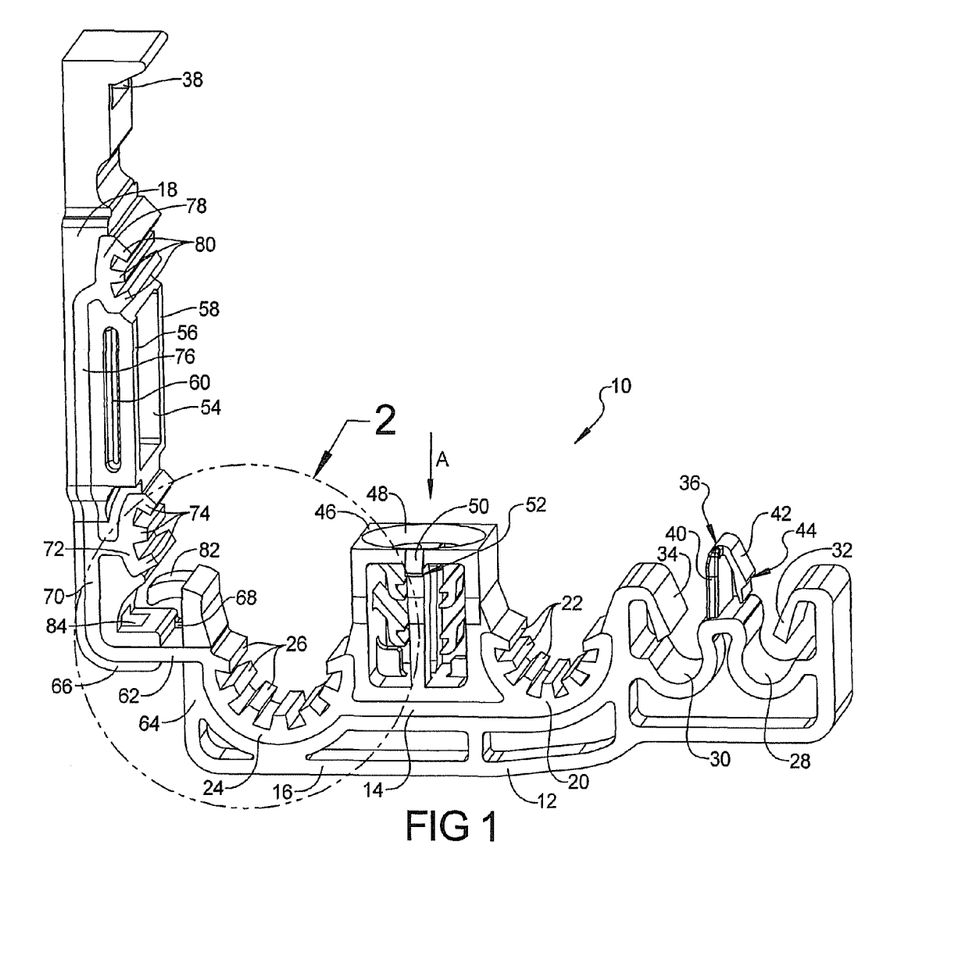
FIG. 1 is a front elevational perspective view of a first aspect of a retention clip of the present disclosure.
Figure 5:
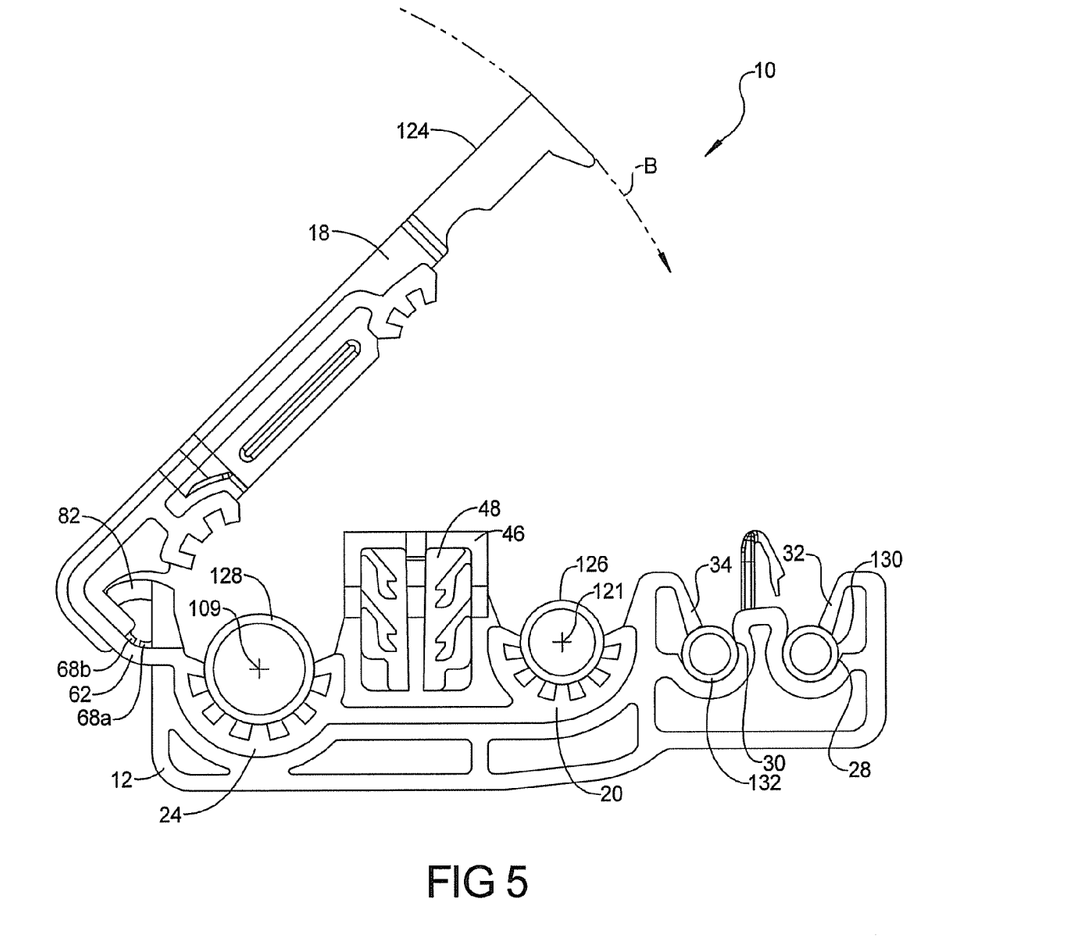
FIG. 5 is a front elevational view of the retention clip of FIG. 4 in a partially closed position.

Referring to FIG. 1, a retention clip 10 of one aspect of the present disclosure includes a clip body 12 of a polymeric first material such as a polyamide material, or a polyoxymethylene material, or other similar polymeric materials having a stiffness necessary to retain the shape of the retention clip when the clip is engaged with one or more tubular members which will be shown and described in better detail in reference to FIG. 5. The clip body 12 is made in a first injection molding process or "shot" in a mold cavity (not shown).

Retention clip 10 can further include a resilient material isolation portion 14 which is made of a resilient second material such as for example a thermoplastic elastomer. The isolation portion 14 is injection molded in a second process or "shot" of a two-shot process to complete the formation of retention clip 10. The materials of clip body 12 and isolation portion 14 are fixedly joined while the materials are at an elevated temperature in the mold such as by a chemical bond acting to fixedly connect the isolation portion 14 to clip body 12.

Clip body 12 includes a first body portion 16 which is rotatably connected to a second body portion 18. Material of the isolation portion 14 when injected in the second molding shot flows via flow channels to create a first isolation member 20 having a plurality of resilient ribs 22, and a second isolation member 24 having a plurality of resilient ribs 26. In addition to first and second isolation members 20, 24, the first body portion 16 can further include first and second retention cavities 28, 30 which do not include the resilient material of isolation portion 14 and can be provided to receive tubular members which do not require sound or vibration isolation with respect to clip body 12. A first retention arm 32 is positioned proximate to the first retention cavity 28 which is elastically deflectable away from the engagement position shown to permit receipt of a tubular member in the first retention cavity 28. Similarly, a second retention arm 34 is positioned proximate to the second retention cavity 30 and operates similar to first retention arm 32. According to several embodiments, the first and second retention arms 32, 34 can face each other as shown, or alternately can both face in a same direction (not shown).

The first body portion 16 of clip body 12 further includes a latching member 36 which elastically deflects to engage within a latch receiving cavity 38 created in second body portion 18 to assist in coupling the first and second body portions 16, 18 together. Latching member 36 includes a rigid wall 40 extending from material of first body portion 16 between the first and second retention cavities 28, 30. A deflecting arm 42 elastically deflects toward rigid wall 40 as the latching member 36 is received in latch receiving cavity 38. A shoulder 44 engages the second body portion 18 after the deflecting arm 42 extends substantially through latch receiving cavity 38 to resist release of deflecting arm 42 and thereby provide a first means of engaging the first and second body portions 16, 18.

First body portion 16 further includes a fastener receiving column 46 which receives and engages a fastener shown and described in reference to FIG. 5. Fastener receiving column 46 includes a column bore 48, which internally receives the fastener, and an externally located catch member 50 on at least one of the external walls of fastener receiving column 46. Each catch member 50 includes a catch tooth 52 created at a free end thereof. A second catch member 50 (not shown in this view) can be oppositely positioned with respect to the catch member 50 shown. As the second body portion 18 rotates to engage with the first body portion 16, the fastener receiving column is slidably received within a second body portion cavity 54 which is created between opposed first and second side walls 56, 58 of second body portion 18. Each of the first and second side walls 56, 58 can include an elongated slot 60. When the first and second body portions 16, 18 are coupled together, the catch tooth 52 of each of the catch members 50 is received in and engages the inner walls of elongated slot 60. This coupling between the catch tooth 52 and elongated slot 60 therefore provides a second means of engaging second body portion 18 to first body portion 16.

Prior to rotating second body portion 18 into engagement with first body portion 16, each of the tubular and/or electrical cable or wires (shown in reference to FIG. 5) are positioned in one of the first or second isolation members 20, 24 or in one of the first or second retention cavities 28, 30. A living hinge 62 flexibly connects the second body portion 18 to first body portion 16. Living hinge 62 is integrally and homogeneously made of the resilient second material and created during injection of the isolation portion 14. The material of living hinge 62 extends between an end wall 64 of first body portion 16 to a connecting wall 66 of second body portion 18, and the material of living hinge 62 thereafter flows into second body portion 18, as will be further described herein. In some aspects, when the retention clip 10 is being formed in the first molding shot, the first material of first body portion 16 partially fills the mold and can then flow into a cavity defining the second body portion 18 via a flow path which after setting creates a frangible connector 68, integrally connecting the first and second body portions 16, 18. First and second body portions 16, 18 can also be independently filled without creation of a frangible connector. The frangible connector 68 is substantially narrower than a width of living hinge 62 such that as the second body portion 18 is rotated toward first body portion 16 as the body portions transition between the open position and the engaged position, frangible connector 68 breaks, thereafter leaving the living hinge 62 as the only connection between the first and second body portions 16, 18 until the coupling members of retention clip 10 engage one another.

As previously discussed, during the second molding shot of retention clip 10, as the material of isolation portion 14 is injected a portion of the resilient second material flows via a first connecting strip 70 into a third isolation member 72, which also creates a plurality of resilient ribs 74. Isolation portion 14 material continues to flow via a second connecting strip 76 directly connected to first connecting strip 70 to thereafter create a fourth isolation member 78 which also creates a plurality of resilient ribs 80. The first and second connecting strips 70, 76 can be provided only on one side of retention clip 10, as shown, or can be duplicated in a mirror image configuration on an opposing side (not visible in this view) to also provide an additional flow path for resilient material to reach the third and fourth isolation members 72, 78.

First body portion 16 can further include a retaining arm 82 which extends away from end wall 64 in the proximity of living hinge 62. As the second body portion 18 is rotated towards an engaged position with first body portion 16, the retaining arm 82, which can be formed in the shape of an arc, is received in a retaining arm cavity 84 created in connecting wall 66 of second body portion 18. The retaining arm 82, when received in retaining arm cavity 84, thereafter provides a third connection between first and second body portions 16, 18. This coupling between the retaining arm 82 and retaining arm cavity 84 provides a third means of engaging second body portion 18 to first body portion 16. In addition to the tubular or electrical components received in a component installation direction "A" and retained by retention clip 10, retention clip 10 can be installed on the fastener as previously described in component installation direction "A".

Referring to FIG. 2 and again to FIG. 1, the frangible connector 68 extends between and is integrally connected to each of an end face 86 of end wall 64 and a connecting wall face 88 of connecting wall 66. As clearly evident, the living hinge 62 is significantly larger (wider and thicker) than frangible connector 68 such that frangible connector 68 does not inhibit rotation about living hinge 62, and frangible connector 68 is induced to break when it is desired to couple the first and second body portions 16, 18. The location of frangible connector 68 can be positioned at any location across the width of living hinge 62 that is accommodated by the geometry of the mold used to create retention clip 10.

Figure 2:
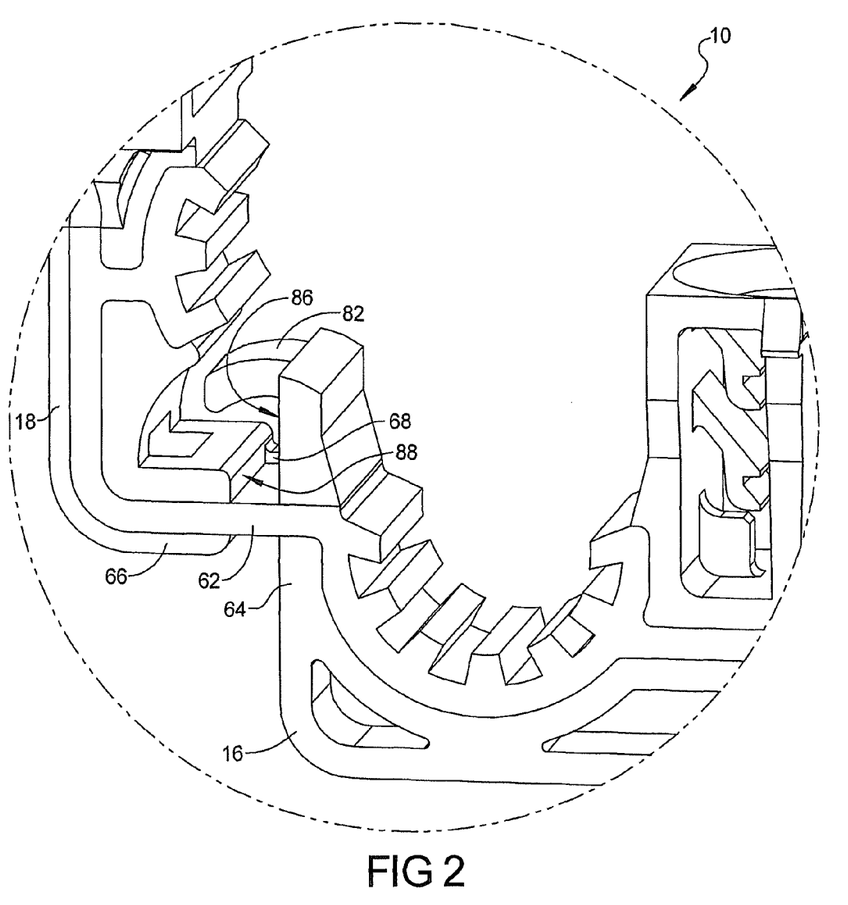
FIG. 2 is a front elevational perspective view of area 2 of FIG. 1.
Figure 3:
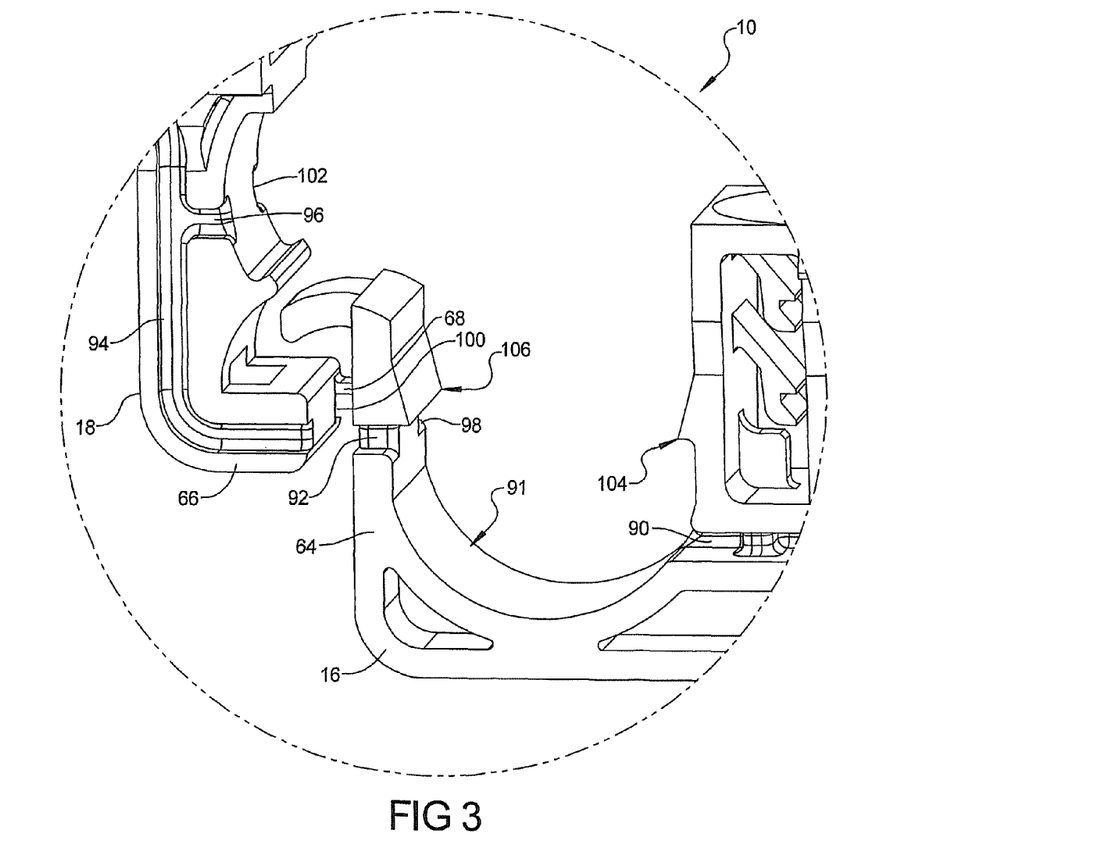
FIG. 3 is a front elevational perspective view similar to FIG. 2, further having a resilient material removed for clarity.

Referring to FIG. 3 and again to FIGS. 1 and 2, the material of isolation portion 14 is omitted to better show the flow channels that are provided for material of isolation portion 14 to flow within and between the first body portion 16 and second body portion 18 during the second molding shot of the two-shot molding process. The first and second body portions 16, 18 are therefore shown in their as-molded condition immediately following the first molding shot having the first and second body portions 16, 18 integrally connected by the frangible connector 68. In the subsequent second molding shot, the material of isolation portion 14 flows via a main flow channel 90 of first body portion 16 toward an arc-shaped surface 91 where second isolation member 24 is formed. A similar arc-shaped surface to arc-shaped surface 91 (not shown in this view) is also provided for formation of first isolation member 20. After flowing through the arc-shaped surface 91, material of isolation portion 14 continues to flow through a living hinge first exit channel 92 created in end wall 64. The isolation portion 14 material flowing past living hinge first exit channel 92 creates living hinge 62 between end wall 64 and connecting wall 66 and thereafter continues to flow via a second body portion first inlet channel 94 to extend through a third isolation member first feed channel 96 to thereby create third isolation member 72 and thereafter by flowing through second body portion first inlet channel 94 to create fourth isolation member 78 through an inlet channel similar to second body portion first feed channel 96. As previously noted, material of isolation portion 14 can also flow on an opposite side (facing away from the viewer as shown in FIG. 3) of retention clip 10. To provide for this, material flowing past arc-shaped surface 91 can also extend through a living hinge second exit channel 98 flowing into what will be the living hinge 62 and thereafter into a second body portion second inlet channel 100 of connecting wall 66. A third isolation member second feed channel 102 which is oppositely positioned with respect to third isolation member first feed channel 96 is shown where material forming third isolation member 72 is received. Similar flow paths are also provided, as described in reference to second body portion first inlet channel 94, to also reach the fourth isolation member 78.

Retention clip 10 is also provided with positive stop or engagement features to resist release of the first and second isolation members 20, 24. This is accomplished using each of a first retention edge 104 and an oppositely positioned and oppositely directed second retention edge 106 created at the outer perimeter ends of the area of arc-shaped surface 91. The function of first and second retention edges 104, 106 will be better described in reference to FIG. 4.

Referring to FIG. 4 and again to FIGS. 1-3, first retention edge 104 integrally extends from a first column wall 108 of fastener receiving column 46. The first retention edge 104 faces toward an isolation member central axis 109. First retention edge 104 extends beyond a rib end face 110 of second isolation member 24 to capture rib end face 110. The second retention edge 106 is similarly provided to capture an opposite end face of second isolation member 24. Second retention edge 106 integrally extends from an end wall portion 112 of end wall 64. The first and second retention edges 104, 106 are positioned proximate to a first rib 113 and a second rib 114 of second isolation member 24. The first and second ribs 113, 114 are the first ribs contacted by the tubular member as it is received by second isolation member 24, therefore first and second ribs 113, 114 may deflect more than the other resilient ribs. The first and second retention edges 104, 106 therefore act to retain isolation member 24 where the greatest resilient rib deflection may occur.

Figure 4:
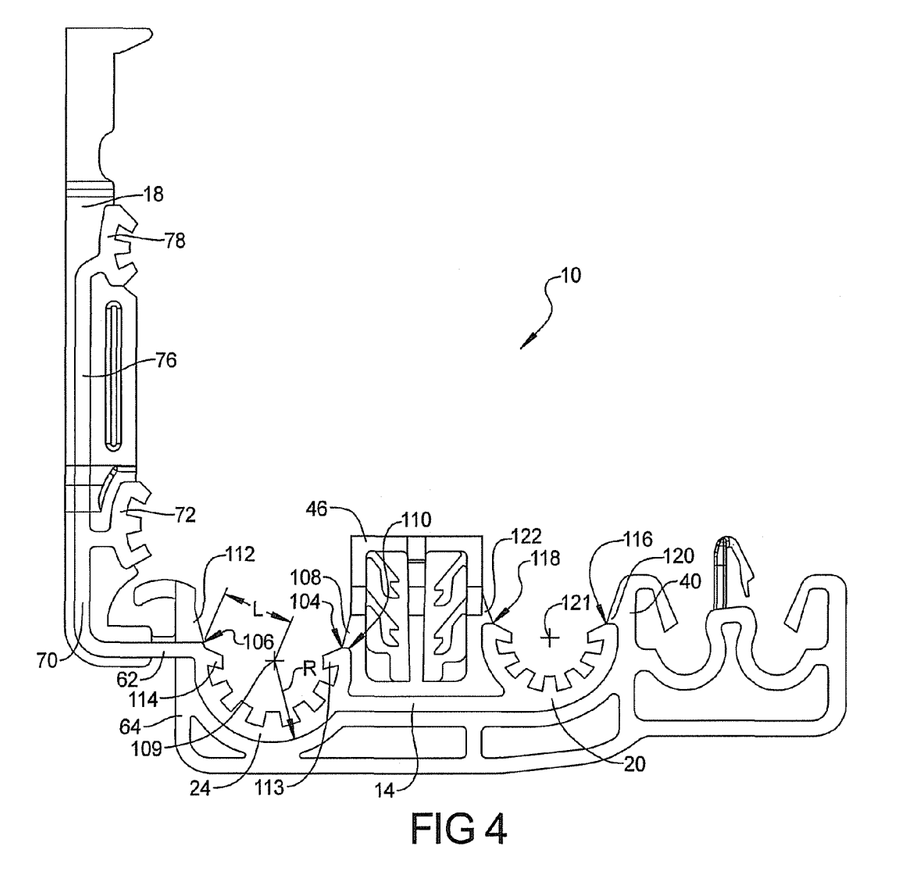
FIG. 4 is a front elevational view of the retention clip of FIG. 1 in an open, disengaged position.

Similar to second isolation member 24, the first isolation member 20 is also retained against the potential for release using each of a third retention edge 116 and an oppositely positioned and oppositely directed fourth retention edge 118. Third retention edge 116 defines an integral extension of a wall portion 120 of rigid wall 40. Fourth retention edge 118 defines an integral extension of a second column wall 122 of fastener receiving column 46. The third and fourth retention edges 116, 118 are each directed generally toward an isolation member central axis 121. According to additional embodiments, each of the third and fourth isolation members 72, 78 can also be provided with one or more retention edges acting to resist release of the third or fourth isolation members 72, 78 from their fixed condition with second body portion 18.

It is noted that the retention edges 104, 106, 116, 118 define an outermost boundary or limit of the isolation members, but do not deflect when the tubular members are loaded, as they are extensions of the walls proximate to the arc-shaped surfaces, but are not contacted by the tubular members. It is further noted the retention edges are positioned outside of the resilient material of the isolation members 20, 24, 72, 78. The retention edges are therefore not positioned in the tool in the spaces defining the arc-shaped surfaces, and additionally contain the resilient material during the second injection shot. The retention edges are therefore not positioned in, encapsulated by, or covered by any portion of the isolation members.

Figure 6:
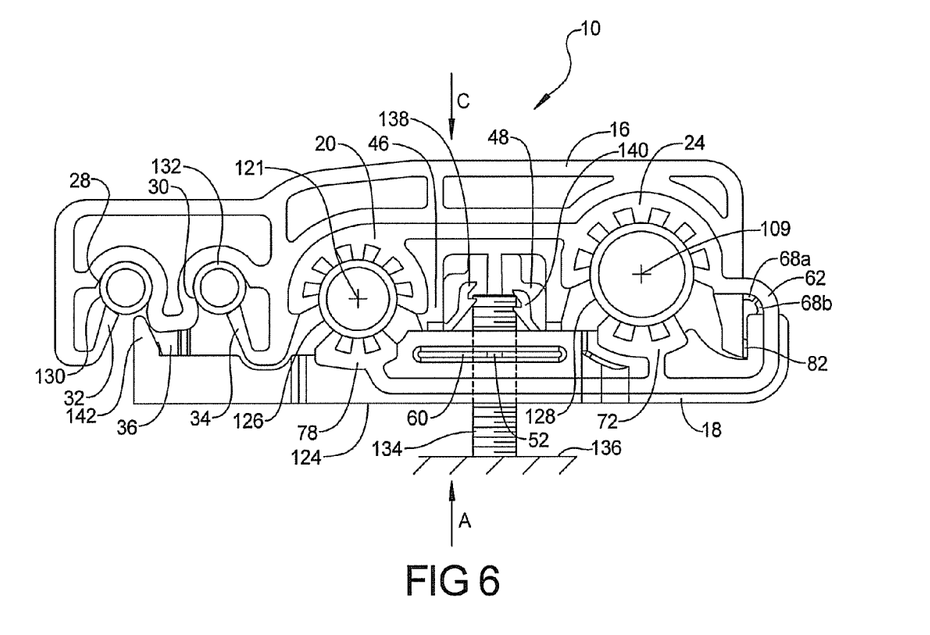
FIG. 6 is a front elevational view of the retention clip of FIG. 4 in a fully engaged position.

Referring to FIG. 5 and again to FIGS. 1-4, the second body portion 18 is rotated toward an engaged position with first body portion 16 preferably before but also optionally after receipt of the tubular shaped members prior to clip body 12 being engaged with a fastener when a side wall 124 of second body portion 18 is positioned facing a plate or panel as will be shown in greater detail in reference to FIG. 6. In the exemplary embodiment shown, a first tube 126 is positioned in contact with first isolation member 20. A second tube 128 is positioned in contact with second isolation member 24. Third and fourth tubes 130, 132 are received in each of the first and second retention cavities 28, 30 such that first and second retention arms 32, 34 elastically spring back to retain the third and fourth tubes 130, 132 in the positions shown.

Second body portion 18 is rotated from the as-molded or open position shown with respect to FIG. 1 toward the closed or engaged position by rotation in a closing arc of rotation "B". The axis of rotation defined by closing arc of rotation "B" extends through living hinge 62. As living hinge 62 is deflected during this rotational movement, the frangible connector 68 breaks, thereby creating individual frangible connector portions 68a, 68b. During this portion of rotation of the second body portion 18, the living hinge 62 defines the only physical connection between the second body portion 18 and first body portion 16. The frangible connector 68 is therefore intentionally designed to break thereby allowing free rotation of second body portion 18 with respect to living hinge 62. After frangible connector 68 breaks, its biasing force acting on the second body portion 18 in an arc of rotation opposite to closing arc of rotation "B" is eliminated. The freely deflectable material of living hinge 62 provides a significantly lower elastic biasing force acting to reopen the second body portion 18 with respect to first body portion 16 compared to the first material of frangible connector 68.

Referring to FIG. 6 and again to FIG. 5, retention clip 10 is shown in the fully closed or engaged position having second body portion 18 in direct contact with and releasably coupled to first body portion 16. As previously described, second body portion 18 is coupled to first body portion 16 using each of the latching member 36, the catch tooth 52 received in elongated slot 60, and by engagement of retaining arm 82 within the retaining arm cavity 84 (not clearly visible in this view). The living hinge 62 is therefore not relied on for positive coupling between the first and second body portions 16, 18 in the engaged position. In the engaged position of retention clip 10, the resilient ribs 22, 26 of the first and second isolation members 20, 24 and the resilient ribs 74, 80 of third and fourth isolation members 72, 78 can elastically compress, or bend as the tubular members are received. The isolation member central axis 109 is positioned substantially coaxial with a longitudinal axis of second tube 128, and the isolation member central axis 121 is positioned substantially coaxial with a longitudinal axis of first tube 126.

To install retention clip 10, a side wall 124 is positioned facing the object the retention clip 10 will be received on such as a vehicle body panel, and is moved in a clip installation direction "C". With side wall 124 facing as shown, a fastener 134, such as a threaded bolt or stud or having an unthreaded shank, is slidably received in column bore 48 of fastener receiving column 46 as retention clip 10 is moved in the clip installation direction "C". The fastener 134 is fully inserted within column bore 48 when side wall 124 directly contacts a panel 136 to which fastener 134 is either releasably or fixedly connected. At this time, fastener 134 is engaged by opposing first and second finger sets 138, 140 which are integrally connected to fastener receiving column 46 and positioned within column bore 48. For example, the first and second finger sets 138, 140 can engage individual threads of fastener 134 if fastener 134 is a threaded fastener. The first and second finger sets 138, 140 thereafter resist removal of retention clip 10 in component installation direction "A" which is oppositely directed with respect to clip installation direction "C". The second body portion 18 can further include an extending end 142 which is partially received in the first retention cavity 28. The second body portion 18 thereby resists release of any of the tubular members captured in the engaged position.

Referring to FIG. 7 and again to FIG. 1, according to additional aspects, a retention clip 144 is modified from retention clip 10, but is similar in materials and most features, therefore only the differences will be further discussed herein. Retention clip 144 includes first and second body portions 146, 148 having a living hinge 150 extending between an end wall 152 and a connecting wall 154. In lieu of the frangible connector 68 provided with retention clip 10, retention clip 144 provides a frangible connector 156 which is integrally and homogeneously connected to each of a retaining arm 158 and a connecting wall upper surface 160 of connecting wall 154. The frangible connector 156, similar to frangible connector 68, breaks during rotation of second body portion 148 with respect to first body portion 146 as the living hinge 150 bends to accommodate the rotational movement. Similar to frangible connector 68, the location of frangible connector 156 also initially provides a gate or flow path for material filling the first body portion of the mold to flow into the second body portion 148, the material thereafter cooling and setting to create frangible connector 156.

Figure 7:
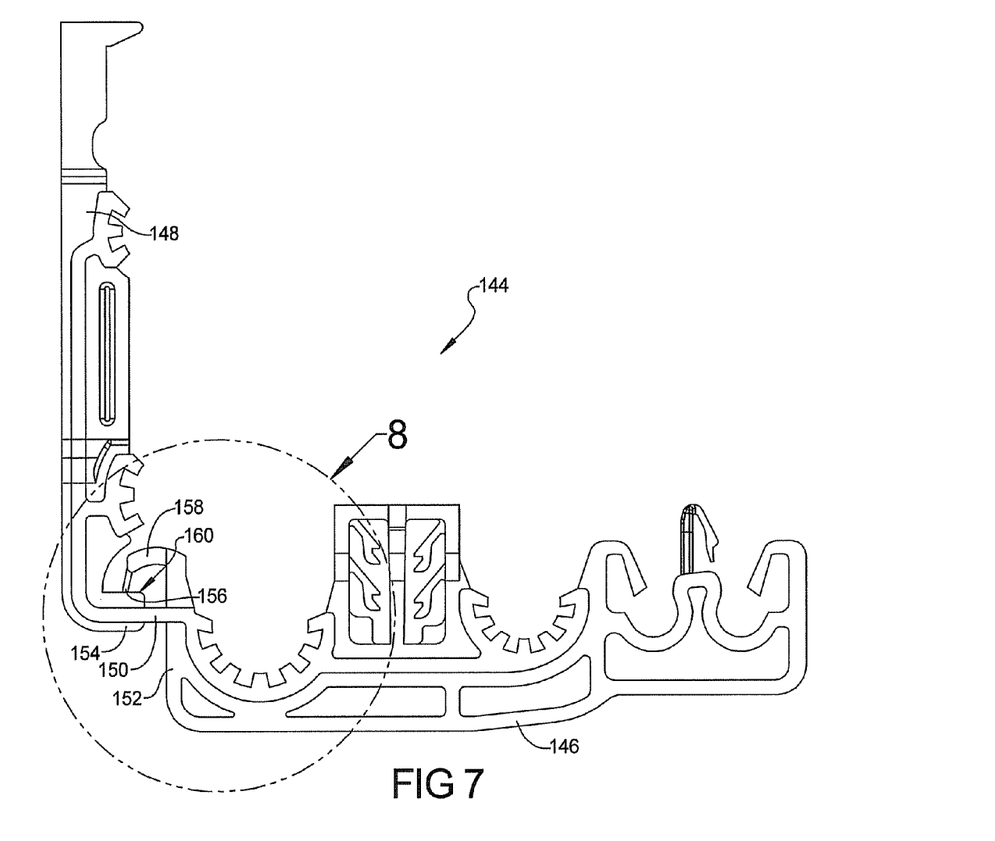
FIG. 7 is a front elevational view of a retention clip of a second aspect of the disclosure.

Referring to FIG. 8 and again to FIG. 7, frangible connector 156 can be positioned between the retaining arm 158 and connecting wall upper surface 160 at any location between these components. A retaining arm cavity 162 created through connecting wall 154 is provided to receive retaining arm 158 as second body portion 148 is rotated with respect to first body portion 146. A frangible connector width "D" is less than a corresponding retaining arm width "E" of retaining arm 158. This width differential promotes the breaking of frangible connector 156 as the retention clip 144 is positioned in its engaged position.

Figure 8:
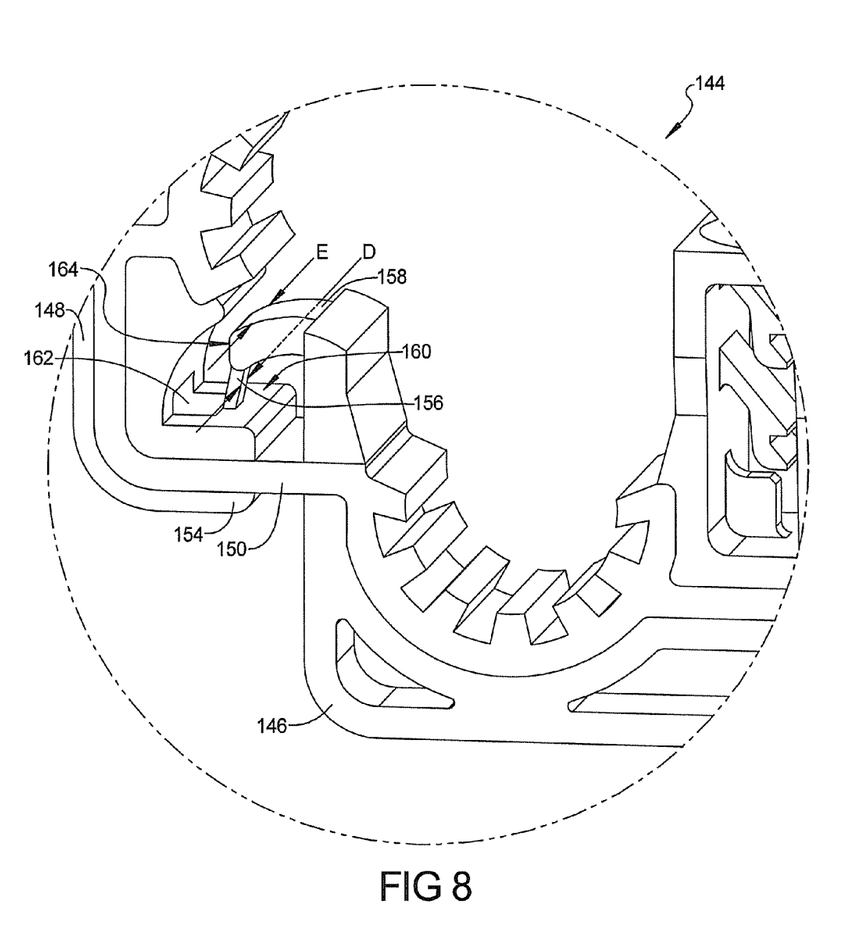
FIG. 8 is a front elevational perspective view of area 8 of FIG. 7.

Referring to FIG. 9 and again to FIGS. 1 and 8, according to several aspects, a retention clip 166 is modified from retention clips 144 and 10 to provide a further or alternate location for a frangible connector, but is similar in materials and most features, therefore only the differences will be further discussed herein. Retaining clip 166 includes a first body portion 168 rotatably connected to a second body portion 170 using a living hinge 172. A frangible connector 174 is integrally connected between a wall end face 176 of an end wall 178 of first body portion 168 and a connecting wall 180 of second body portion 170. Similar to the previously described retention clips 10 and 144, frangible connector 174 breaks as the second body portion 170 is rotated toward first body portion 168. The frangible connector 174 is positioned beneath the living hinge 172 as viewed in reference to FIG. 9. This position of frangible connector 174 is out of plane with respect to living hinge 172 compared to retention clip 10 and oppositely positioned about living hinge 172 with respect to frangible connector 156 of retention clip 144.

Figure 9:
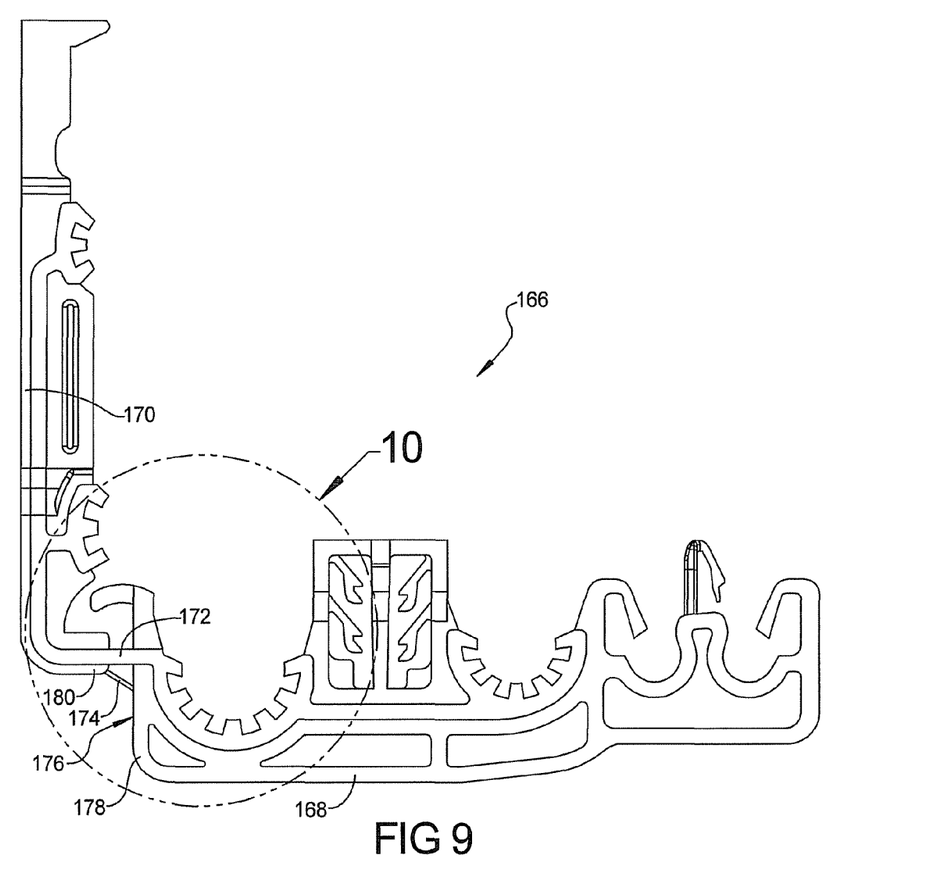
FIG. 9 is a front elevational view of a retention clip of a third aspect of the disclosure.

Referring to FIG. 10 and again to FIG. 9, frangible connector 174 is integrally and homogeneously connected to a connecting wall lower surface 182 of connecting wall 180. This position of frangible connector 174 loads the frangible connector under tension as the first and second body portions 168, 170 are rotated toward each other.

Figure 10:
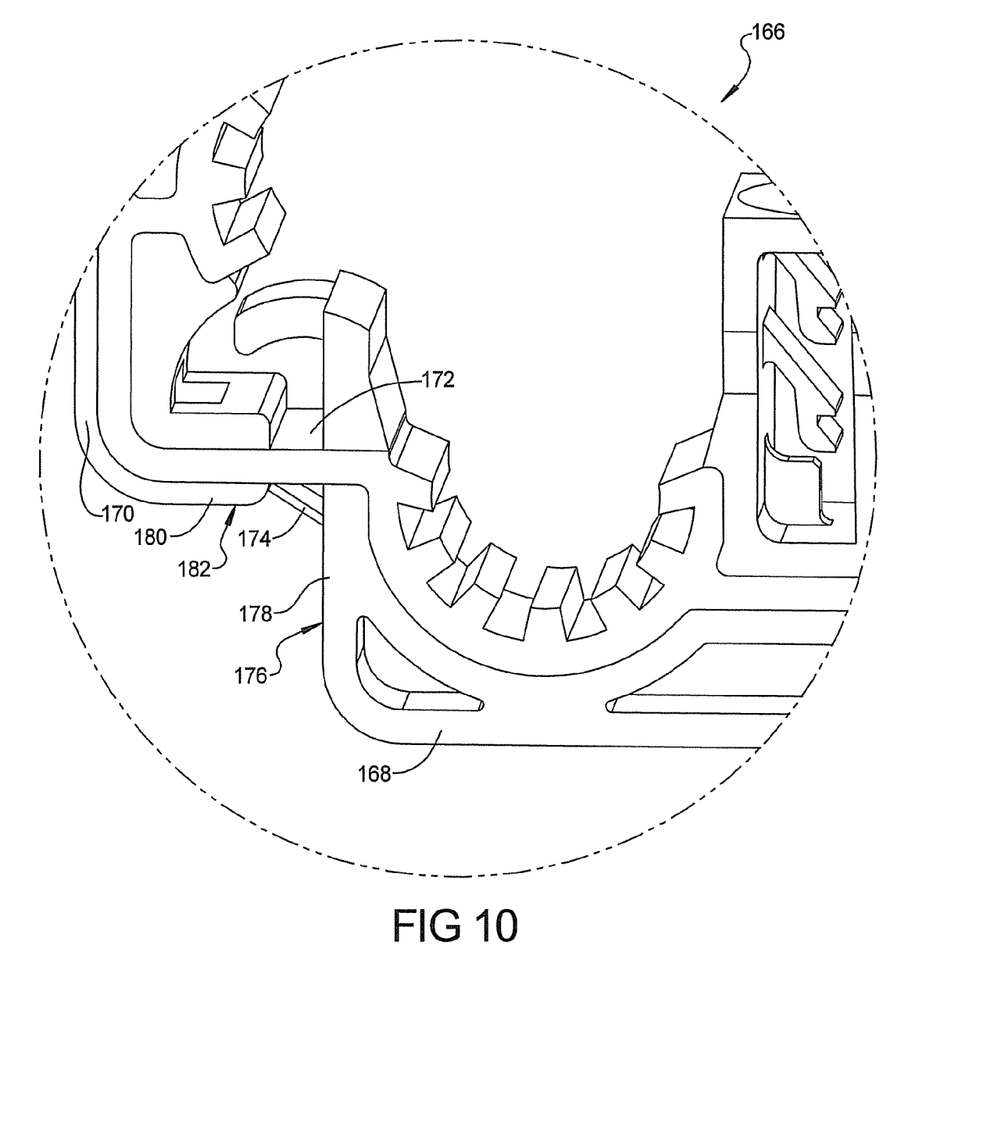
FIG. 10 is a front elevational perspective view of area 10 of FIG. 9.

With continuing reference to FIGS. 3, 8 and 10, it will be seen that the different locations of the frangible connectors causes each of the frangible connectors to break under a different applied load. Frangible connector 68 breaks substantially under a shear load. Frangible connector 156 breaks substantially under a compression load. Frangible connector 174 breaks substantially under a tension load. Because of this, the amount of load required to break each of the frangible connectors can vary, and one of the designs can be selected over the other designs if a higher or lower breaking load is desired.

Figure 11:
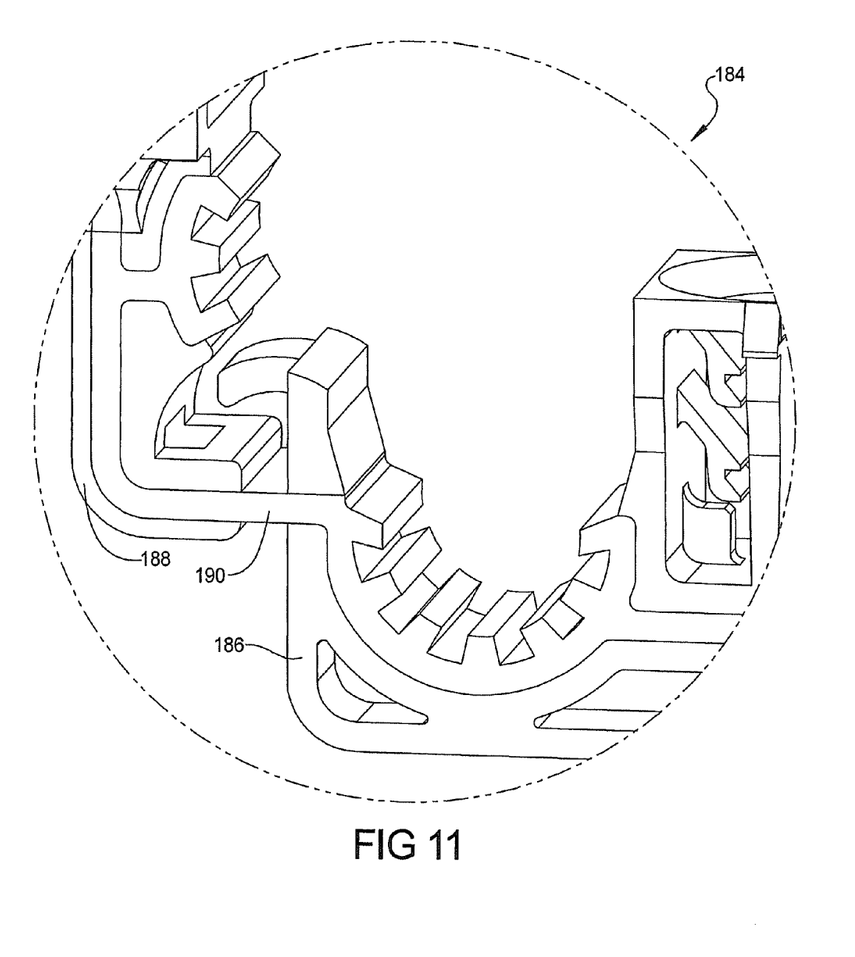
FIG. 11 is a front elevational perspective view similar to area 10 showing a fourth aspect of the disclosure.

Referring to FIG. 11 and again to FIGS. 1-10, a retention clip 184 is further modified from the previously described retention clips 10, 144, and 166, but is similar in materials and most features, therefore only the differences will be further discussed herein. A frangible connector between a first body portion 186 and a second body portion 188 is omitted in the design of retention clip 184. The first and second body portions 186, 188 of retention clip 184 are therefore solely coupled in the open position by a living hinge 190 created from the material of isolation portion 14 described in reference to FIG. 1. Retention clip 184 is therefore created by individual flow gates (not shown) in a mold providing material separately to the first and second body portions 186, 188. The isolation portion 14 material is injected in the second shot molding process of retention clip 184 similar to that previously described herein.

Retention clips 10, 144, 166 and 184 of the present disclosure offer several advantages. Retention clips 10, 144, 166 and 184 include first and second body portions (such as 16, 18) both created of a first polymeric material. The first polymeric material can be a polyamide plastic or similar plastic providing good resistance to deflection, while also providing good wear and resistance to environmental conditions such as heat, cold, fluids such as gasoline, oil, or the like which are present in applications such as in automotive applications. The body portions 16, 18 when angularly rotated with respect to each other define an open position (such as shown in FIGS. 1, 7, 9 and 11), and when rotated into direct contact with each other define an engaged position (shown in FIG. 6). An isolation portion 14 is created of a resilient second polymeric material, for example from TPE (thermoplastic elastomer). The isolation portion 14 includes isolation members 20, 24, 72, 78 which are individually connected to one of the first or second body portions 16, 18. The isolation members (20, 78) or (24, 72) are positioned facing each other when the retention clip 10, 144, 166 and 184 is in the engaged position. The isolation members (20, 78) or (24, 72) frictionally contact and thereby retain the tubular shaped member (126, 128) in the engaged position.

The living hinge 62, 150, 172, 190 integrally connects the body portions allowing the body portions to rotate with respect to each other. The living hinge provides the only connection between the body portions as the body portions transition between the open position and the engaged position. This limits resistance to rotation of the body portions and reduces the tendency of known clip designs having body portion material retained in the area of the living hinge to create a biasing force when bent, which operates to push the body portions away from each other in the engaged condition. The frangible connector 68, 156, 174 initially integrally connects the first and second body portions in the open position using the first polymeric material. According to the present disclosure, when frangible connector 68, 156, 174 is present, the frangible connector breaks when or as soon as the body portions move away from the open position and toward the engaged position. As previously noted this limits the connection between the first and second body portions to only the living hinge, which offers a lower resistance to rotation than the material of the body.

With continuing reference to FIG. 4, prepositioned retention edges such as first and second retention edges 104, 106 act to retain the isolation members of the first or second body portions in direct contact with the arc-shaped surfaces that seat the isolation members. The retention edges are positioned proximate to ends of the arc-shaped surface such as arc-shaped surface 91. A distance "L" defined for example between central axis 109 and either of the retention edges 104,106 is less than length of a radius of curvature "R" of the arc-shaped surface to ensure the retention edges 104, 106 restrain the isolation member such as isolation member 24. The retention edges are each directed toward a central axis defined by the arc-shaped surface to position a portion of the polymeric first material in locations which resist release or displacement of the isolation members 20, 24, or 72, 78.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A retention clip, comprising:
first and second body portions both created of a substantially stiff first polymeric material, the body portions when rotated away from contacting each other defining an open position, and when rotated into contact with each other defining an engaged position;

an isolation portion created of a resilient second polymeric material, the isolation portion including:
a first isolation portion on the first body portion having a plurality of ribs and a second isolation portion on the second body portion having a plurality of ribs, the ribs of the first isolation portion directed toward the ribs of the second isolation portion such that the ribs compress when receiving a tubular member when the retention clip is in the engaged position; and
a living hinge integrally connecting the first and second isolation portions, and thereby connecting the body portions about which the body portions rotate with respect to each other; and
a frangible connector of the first polymeric material initially integrally connecting the first and second body portions in the open position, the frangible connector breaking when the body portions move away from the open position and toward the engaged position, and after the frangible connector breaking, the living hinge and thereby the resilient second polymeric material providing the only continuous connection between the body portions as the body portions transition between the open position and the engaged position;
wherein the living hinge defines a fixed arc of rotation about which the body portions rotate with respect to each other that remains substantially the same both before and after the frangible connector breaking.

2. The retention clip of claim 1, wherein the frangible connector is positioned parallel to the living hinge in the open position and is broken by a bending force as the body portions move away from the open position and toward the engaged position.

3. The retention clip of claim 1, further including a retaining arm extending from the first body portion and received in a retaining arm cavity of the second body portion when the body portions are in the engaged position; wherein the frangible connector is initially integrally connected to the retaining arm and to a connecting wall of the second body portion in the open position and is broken by a compression force as the body portions move away from the open position and toward the engaged position.

4. The retention clip of claim 1, wherein the frangible connector is initially integrally connected to a wall end face of the first body portion and to a connecting wall of the second body portion in the open position, and is broken by a tension force as the body portions move away from the open position and toward the engaged position.

5. The retention clip of claim 1, further including an isolation member connected to each of the body portions and positioned in alignment when the retention clip is in the engaged position, the isolation member of both body portions acting to frictionally contact a tubular shaped member therebetween to retain the tubular shaped member in the engaged position of the retention clip.

6. The retention clip of claim 5, further including:
an arc-shaped surface of the first body portion provided to receive the isolation member of the first body portion; and
opposed first and second retention edges proximate to the arc-shaped surface, both directed toward a central axis defined by the arc-shaped surface, the first and second retention edges acting to retain the isolation member of the first body portion in direct contact with the arc-shaped surface.

7. The retention clip of claim 1, further including:
a retaining arm extending from the first body portion proximate to the living hinge, the retaining arm received in a retaining arm cavity of the second body portion when the body portions are in the engaged position; and
a latching member having a deflecting arm received in a latch receiving cavity of the second body portion when the body portions are in the engaged position.

8. A retention clip, comprising:
first and second body portions both created of a first substantially stiff polymeric material, the body portions when angularly rotated apart defining an open position, and when rotated into direct contact with each other defining an engaged position;
an isolation portion created of a resilient second polymeric material, the isolation portion including:
isolation members individually connected to each of the first and second body portions, the isolation members positioned facing each other when the retention clip is in the engaged position, the isolation members frictionally contacting and thereby retaining a tubular shaped member in the engaged position; and
a living hinge connecting the body portions about which the body portions rotate with respect to each other, the resilient material of the living hinge providing a lower resistance to rotation than the material of the body, the living hinge integrally connected to the isolation members via an exit channel created in the first body portion and a flow channel created in the second body portion, the exit and flow channels providing a flow path for material of the isolation members to flow within and between the first body portion and the second body portion during formation of the clip; and
a frangible connector of the first polymeric material initially integrally connecting the first and second body portions only in the open position, the frangible connector breaking when the body portions move away from the open position and toward the engaged position, and after the frangible connector breaking, the living hinge and thereby the resilient second polymeric material provide the only continuous connection between the body portions as the body portions transition between the open position and the engaged position;
wherein the frangible connector is positioned parallel to the living hinge in the open position.

9. The retention clip of claim 8, further including a retaining arm extending from the first body portion and received in a retaining arm cavity of the second body portion when the body portions are in the engaged position.

10. The retention clip of claim 9, wherein the frangible connector is initially integrally connected to the retaining arm and to a connecting wall of the second body portion in the open position.

11. The retention clip of claim 9, wherein the frangible connector has a width less than a width of the retaining arm.

12. The retention clip of claim 8, wherein each of the isolation members includes a plurality of resilient ribs, the ribs of both of the first and second body portions in contact with the tubular shaped member only after the frangible member breaks.

* * * * *